(12) United States Patent
Gaonkar et al.

(10) Patent No.: US 7,769,859 B1
(45) Date of Patent: Aug. 3, 2010

(54) CONTROLLING ACCESS TO MANAGED OBJECTS IN NETWORKED DEVICES

(75) Inventors: Vinay Gaonkar, Milpitas, CA (US); Keith McCloghrie, Pawling, NY (US); Sanjeev Chidambar Joshi, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 970 days.

(21) Appl. No.: 11/107,500

(22) Filed: Apr. 15, 2005

(51) Int. Cl.
*G06F 15/16* (2006.01)
(52) U.S. Cl. .................. 709/225; 709/223; 709/224
(58) Field of Classification Search ............... 709/223, 709/225, 224; 719/316
See application file for complete search history.

(56) References Cited

U.S. PATENT DOCUMENTS

| | | | |
|---|---|---|---|
| 5,961,594 A | 10/1999 | Bouvier et al. | |
| 5,999,978 A * | 12/1999 | Angal et al. | 709/229 |
| 6,038,563 A * | 3/2000 | Bapat et al. | 1/1 |
| 6,195,097 B1 | 2/2001 | Shrader et al. | |
| 6,236,996 B1 * | 5/2001 | Bapat et al. | 1/1 |
| 6,385,172 B1 * | 5/2002 | Kataria et al. | 370/238 |
| 6,519,635 B1 * | 2/2003 | Champlin et al. | 709/223 |
| 6,532,491 B1 * | 3/2003 | Lakis et al. | 709/223 |
| 6,724,408 B1 | 4/2004 | Chen et al. | |
| 7,010,780 B2 * | 3/2006 | Perycz et al. | 717/107 |
| 7,039,724 B1 | 5/2006 | Lavian et al. | |
| 7,076,540 B2 | 7/2006 | Kurose et al. | 709/223 |
| 7,099,947 B1 * | 8/2006 | Nadeau et al. | 709/229 |
| 7,225,244 B2 | 5/2007 | Reynolds et al. | |
| 7,260,621 B1 * | 8/2007 | Lavian et al. | 709/223 |
| 7,293,052 B1 * | 11/2007 | Kavasseri | 709/229 |
| 7,313,631 B1 | 12/2007 | Sesmun et al. | |
| 7,356,601 B1 * | 4/2008 | Clymer et al. | 709/229 |
| 7,480,934 B2 * | 1/2009 | Chan et al. | 726/8 |
| 7,594,170 B2 | 9/2009 | Snover et al. | |
| 7,698,359 B2 | 4/2010 | Wray et al. | |
| 2002/0124064 A1 | 9/2002 | Epstein et al. | |
| 2002/0184409 A1 | 12/2002 | Broussard | |
| 2003/0126195 A1 | 7/2003 | Reynolds et al. | |
| 2004/0003112 A1 * | 1/2004 | Alles et al. | 709/237 |
| 2004/0041833 A1 | 3/2004 | Dikhit | |
| 2005/0088449 A1 | 4/2005 | Blanco et al. | |
| 2005/0097440 A1 * | 5/2005 | Lusk et al. | 715/500.1 |
| 2005/0195660 A1 | 9/2005 | Kavuri et al. | |
| 2007/0234228 A1 | 10/2007 | Rao et al. | |

OTHER PUBLICATIONS

Special Edition Using Microsoft Access 2000 by Riger Jennings. Publisher: Que. Pub. Date: May 5, 1999.*

(Continued)

*Primary Examiner*—William C Vaughn, Jr.
*Assistant Examiner*—Boris Gorney
(74) *Attorney, Agent, or Firm*—Stolowitz Ford Cowger LLP

(57) ABSTRACT

Controlling access to managed objects associated with a networked device. A method comprises receiving a request from a principal for access to a managed object associated with the networked device. The managed objects are accessible based on membership in access groups that are compliant with a Simple Network Management Protocol (SNMP). A first and a second of the access groups associated with the principal are determined. Access privileges for the principal are determined, based on the first and the second access groups. Access to the managed object is granted if permitted based on the access privileges for the principal.

12 Claims, 5 Drawing Sheets

OTHER PUBLICATIONS

Extending Network Security with Cisco IOS Software Release 12.3(7)T. Cisco Systems. Mar. 2004, p. 12.*

Extending Network Security with SISCO IOS Software Release 12.3(7)T. Cisco Systems. Mar. 2004, p. 12.*

Extending Network Security with SISCO IOS Software Release 12.3(7)T CISCO Systems. Mar. 2004, p. 12.*

Cisco IOS Configuration Fundamentals and Network Management Command Reference, Release 12.3 T, CISCO Systems, p. CFR-511.*

Wijnen, B., McCloghrie, K.; RFC 3415—View-based Access Control Model (VACM) for the Simple Network Management Protocol (SNMP); Dec. 2002; http://www.faqs.org/rfcs/rfc3415.html.

Harrington, D., Preshun, R., Wijnen, B.; RFC3411—An Architecture for Describing Simple Network Management Protocol (SNMP) Management Frameworks; Dec. 2002; http://www.faqs.org/rfcs/rfc3411.html.

Harrington, D., Preshun, R., Wijnen, B.; RFC 2571—An Architecture for Describing (SNMP Management Frameworks); Apr. 1999; http://www.faqs.org/rfcs/rfc2571.html.

Wijnen, B.; Preshun, R., McCloghrie, K.; RFC 2575—View-based Access Control Model (VACM) for the Simple Network Management Protocol (SNMP); Apr. 1999; http://www.faqs.org/rfcs/rfc2575.html.

* cited by examiner

CONTROLLING ACCESS TO MANAGED OBJECTS IN NETWORKED DEVICES

FIELD OF THE INVENTION

Embodiments of the present invention relate to managing devices coupled to a network. More specifically, embodiments of the present invention relate to a method, system, and apparatus for controlling access to managed objects associated with networked devices.

BACKGROUND OF THE INVENTION

Simple Network Protocol Management (SNMP) provides a simple protocol for managing devices in a network. FIG. 1 illustrates a network management station 120 communicating with agents 124 in managed devices 126 via an SNMP protocol. The network management station 120 executes network management applications 122 that monitor and control the managed devices 126. The interface 128 allows users 130, such as network administrators, to access the network management station 120.

The managed devices 126 have agents 124, which are typically software modules that collect and store management information and provide an interface between the network management station 120 and the managed device(s) 126. The network management station 120 and the agents 124 communicate via a simple set of commands and employ a Management Information Base (MIB) 132. A MIB 132 describes various managed objects associated with its managed device 126. To retrieve or modify information, the network management station 120 sends a request to the managed device 126, identifying a managed object in the MIB 132.

Principals may make requests to access the managed objects via the network management station. A principal may be a user acting in a particular role, a set of users each acting in a particular role, an application, a set of applications, or a combination of these. SNMP has an access control mechanism that controls the access privileges a principal has to managed objects. For example, one principal may only have read access to certain managed objects, while another principal may have read/write access to those managed objects. Furthermore, access control may be used in connection with SNMP notification messages.

SNMP has a specification for an engine that comprises an access control subsystem that checks whether a specific type of access (e.g., read, write, notify) to a particular managed object (instance) is allowed. The access control subsystem may use an access control model that specifies sets of access control rules that pertain to respective groups of principals. In the SNMP view-based access control model (VACM), a group is a set of principals that have certain access privileges to managed objects. In an SNMP view-based access control model, the combination of a securityModel and a securityName maps to at most one group. A securityName is the principal on whose behalf access is requested and a securityModel is a security model under which access is requested. Some SNMP access control models are known as "view-based." However, other than "view-based" models are contemplated.

The relative simplicity of SNMP has led to its proliferation. However, SNMP's simplicity constrains its flexibility and functionality. For example, an ultimate determination of access to a managed object may involve additional factors to those already discussed, including: securityLevel (Level of Security under which access is requested), viewType (view to be checked (read, write or notify)), contextName (context in which access is requested), and variableName (object instance to which access is requested). Because many factors are involved in determining access to a managed object in a networked device, it would be possible for complexity to increase greatly if individual portions of the overall process are made even slightly more complex. Moreover, it is difficult to foresee where a benefit of adding complexity to the process may outweigh a cost of the added complexity.

Therefore, it would be desirable to have a method and system for management of networked devices that is simple and flexible. It would be advantageous if this method and system were compatible with an SNMP protocol.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
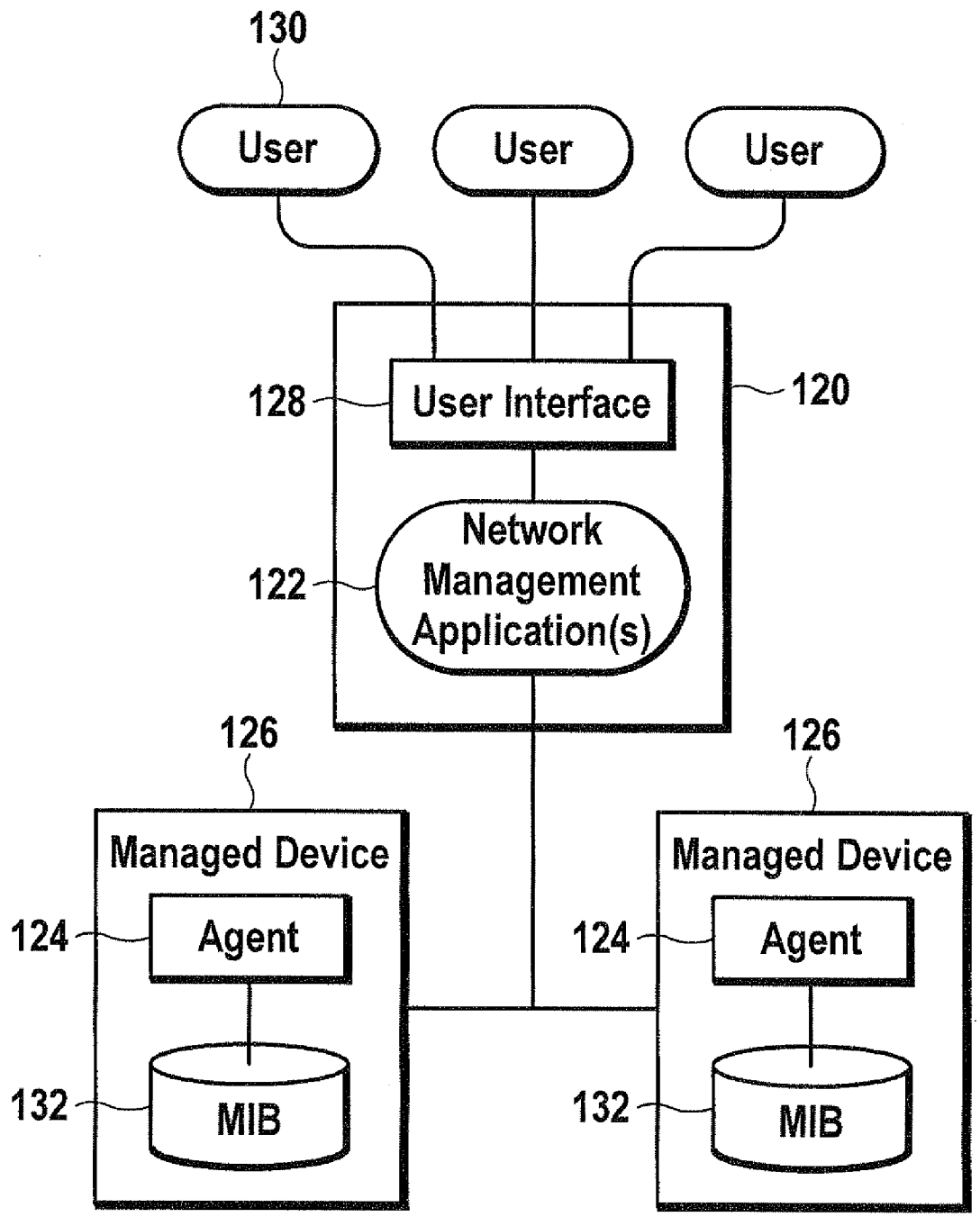
FIG. 1 illustrates a network management station communicating with agents in managed devices via a conventional SNMP protocol.
Figure 2:
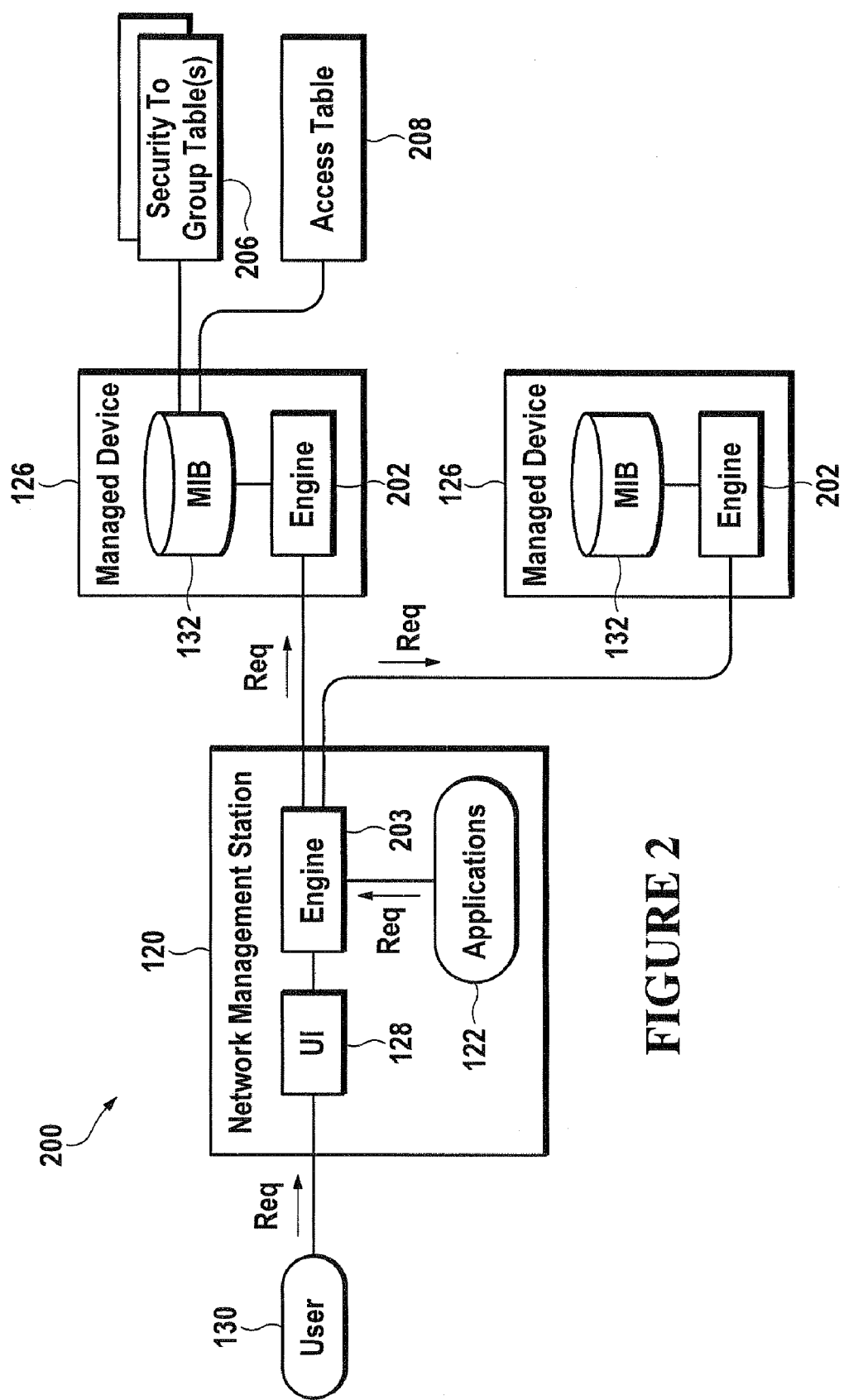
FIG. 2 illustrates a network in accordance with an embodiment of the present invention.

FIG. 2 illustrates a network 200 in accordance with an embodiment of the present invention. The network management station 120 receives requests from a principal (e.g., user 130, application 122) for access to managed objects associated with one of the managed devices 126. Each principal is a part of at least one group that defines access privileges to managed objects. A principal's access privileges are defined by the union of the privileges of all groups to which a principal belongs, in one embodiment. However, the principal's access privileges may be defined by other than the union of the privileges of all groups to which a principal belongs.

Each managed device 126 has a management information base (MIB) 132 defining managed objects. In one embodiment, the managed objects are accessible based on membership in access groups that are compliant with a Simple Network Management Protocol (SNMP). Each access group defines a set of access privileges accorded to the principals in the group. In one embodiment, if a principal is a member of any SNMP group that has access privileges to the managed object, it is allowed access. Each managed device 126 also has an engine 202 for controlling access to the managed objects. The engine 202 enforces a set of rules for accessing the managed objects. The rules comprise a rule in which a principal name is allowed to belong to more than one access group. The managed device may be a router, switch, etc.

The network 200 has a network management station 120 communicatively coupled to the managed devices 126, wherein the network management station 120 is operable to send requests to the managed devices 126 for access to the managed objects. In this fashion, the network management station 120 may be used to view and configure parameters associated with the managed devices 126.

In one embodiment, one of the applications 122 is a command generator application that initiates a request to add or delete a security name (or principal name) to or from a group. In this fashion, one or more of the security to group tables 206 are modified by the application 122.

However, it is not required that the applications 122 or the network management station engine 203 be aware of a managed device's ability to map a security name/security model combination to multiple groups. Thus in one embodiment, the engine 203 is compliant with an SNMP protocol that allows a security name/security model combination to map to only a single group. In one embodiment, an application is compliant with an SNMP protocol that allows a security name/security model combination to map to only a single group.

The managed devices 126 have stored thereon one or more security to group tables 206 that map a combination of a security name and security model to at least one group name. Furthermore, the managed devices 126 have stored thereon an access table 208 that defines access privileges for each group. The MIB 132 defines the structure for the security to group tables 206 and the access table 208. An exemplary MIB is described herein.

In one embodiment, the managed devices 126 and network management station 120 have processors for implementing the engines (202, 203) and computer readable media for implementing the MIBs (132). For example, the security to group tables 206 and access tables 208 may be stored in a computer readable medium that is accessible by the engine 202.

Figure 3A:
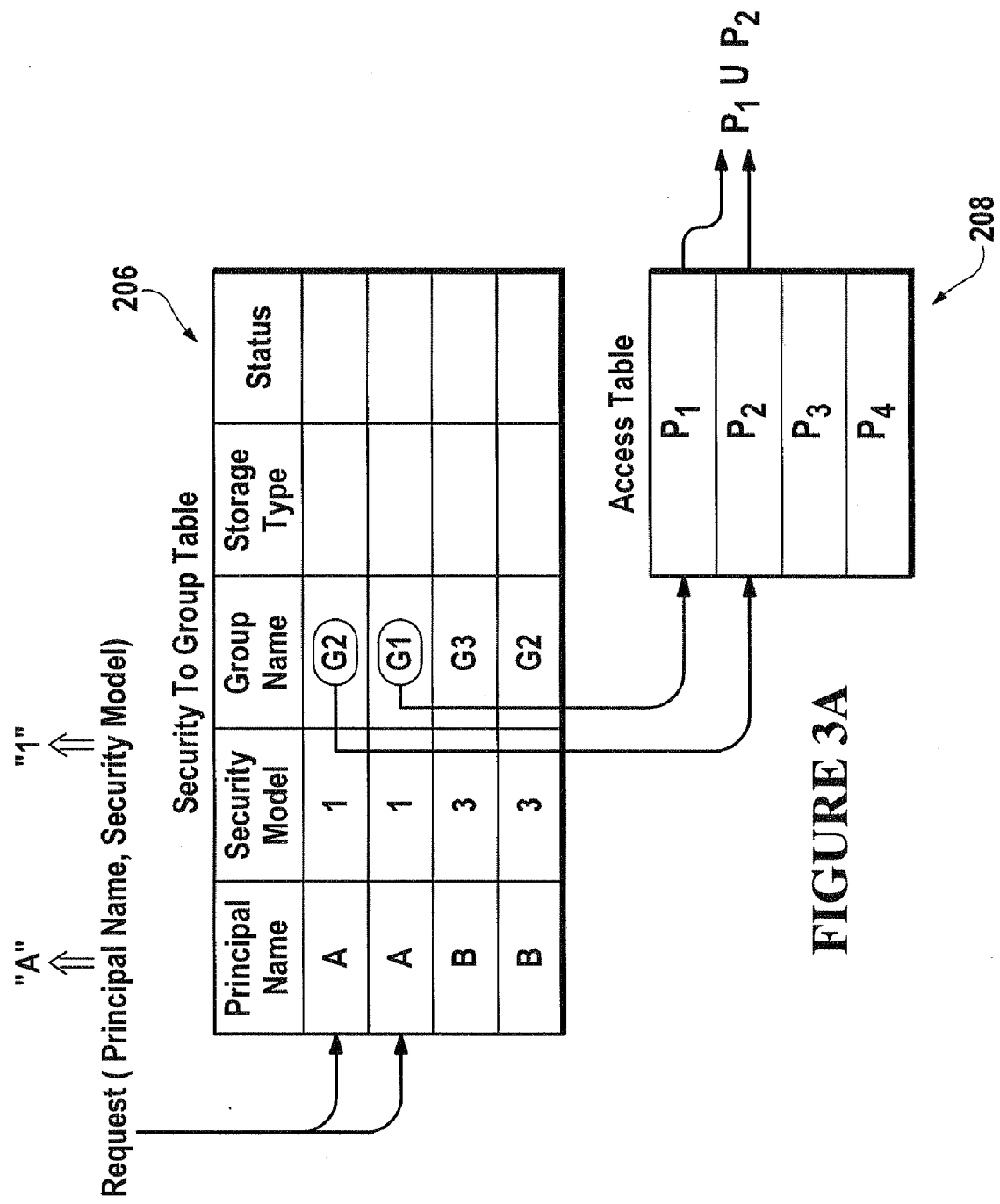
FIG. 3A and FIG. 3B illustrate tables used to determine access privileges in accordance with an embodiment of the present invention.

FIG. 3A illustrates tables used to determine access privileges in accordance with an embodiment of the present invention. In particular, FIG. 3A illustrates access privileges determination for a received request. The request comprises a principal name and a security model, in this embodiment. In one embodiment, the format of the request is compliant with in an SNMP protocol, such as "An Architecture for Describing SNMP Management Frameworks (RFC 3411). However, the request is not limited to this architecture. The security to group table 206 is organized with rows each having an entry for a principal name, a security model, a group name, a storage type, and a status. The security to group table 206 allows a combination of a principal name and a security model to be mapped to multiple groups. In this example, the combination of the principal name of "A" and security model "1" are associated with group names "G1" and "G2".

The access privileges table 208 contains a row for each group, wherein each group has a defined set of access privileges. In this example, the access privileges table 208 is indexed separately with group G1 and with group G2, wherein the access privileges are the union of the privileges accorded to group G1 and group G2. However, the access privileges do not have to be formed by a logical union. In one embodiment, the access table 208 is compliant with an SNMP protocol. Thus, managed objects may be accessible based on a requesting principal's membership in access groups that are compliant with a Simple Network Management Protocol (SNMP).

Figure 3B:
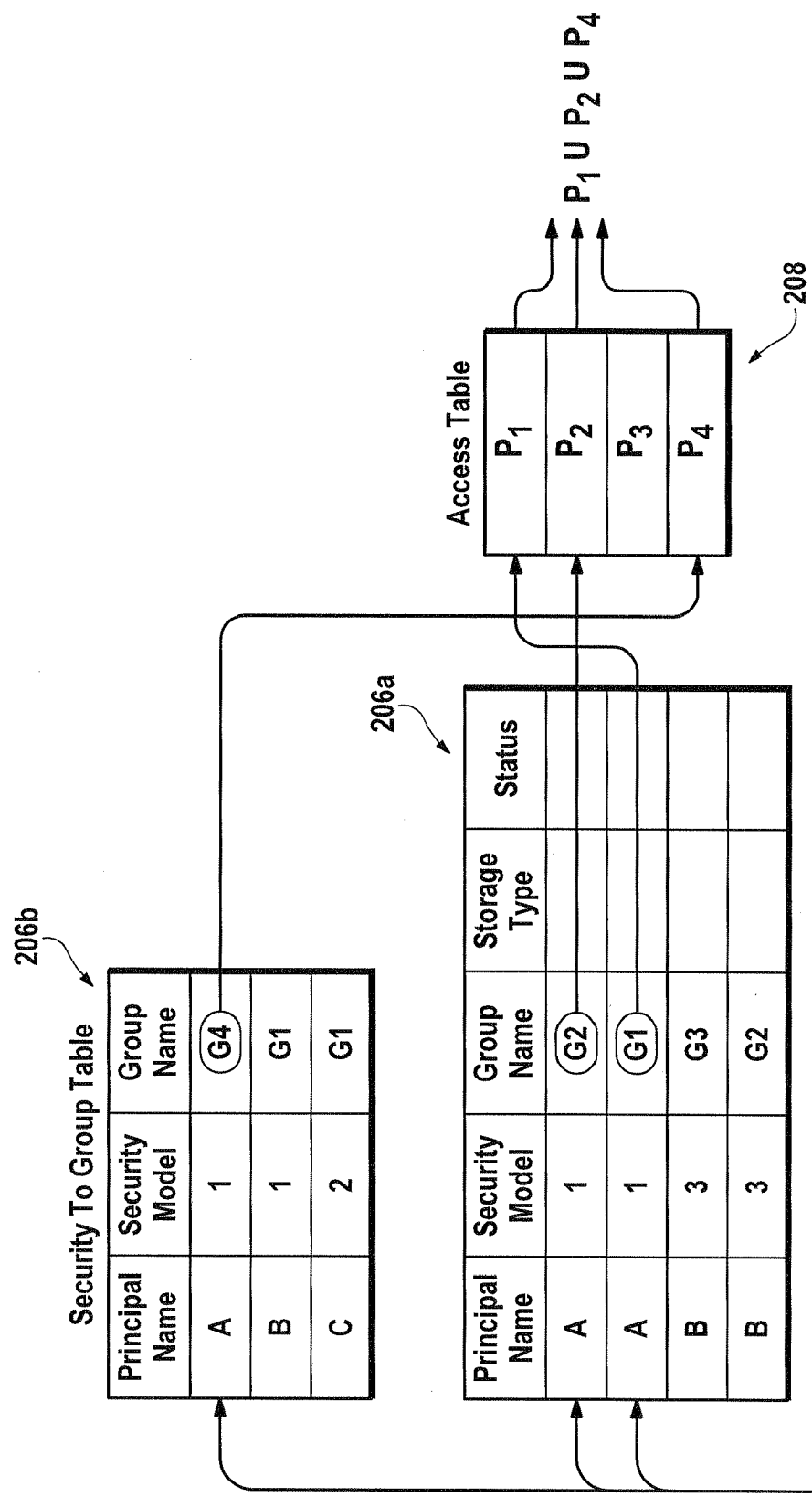

FIG. 3B illustrates tables used to determine access privileges in accordance with an embodiment of the present invention. FIG. 3B illustrates an extended security to group table 206a and an access privilege table 208 that are similar to the tables in FIG. 3A. FIG. 3B also has a basic security to group table 206b that maps a combination of a security name and a security model to only one group. In one embodiment, basic security to group table 206b is compliant with an SNMP protocol. In one embodiment, the group table 206b is compliant with View-based Access Control Model (VACM) for the Simple Network Management Protocol (SNMP) (RFC 3415). However, the basic security to group table 206a is not limited to this implementation. In the example of FIG. 3B, the combination of the security name "A" and security model "1" are associated with only group name "G4", in the basic security to group table 206b. Furthermore, in this example, the access privileges table 208 is indexed separately with group names "G1", "G2" and "G4," wherein the access privileges are the union of the privileges accorded to groups "G1", "G2" and "G4." However, the access privileges may be formed by other than the union of the privileges accorded to groups "G1", "G2" and "G4."

Table I-Table V define portions of an exemplary MIB that may be used as an extension of a "vacmSecurityToGroupTable" defined in an SNMP protocol, such as RFC 3415. However, the present invention is not limited to this exemplary MIB. Furthermore, the present invention limited to an extension of a "vacmSecurityToGroupTable" defined in an SNMP protocol.

Table I depicts a structure for an exemplary security to group table, "cvacmSecurityToGroupTable", in accordance with an embodiment of the present invention. The cvacmSecurityToGroupTable table depicted in Table I provides a mechanism to map a combination of 'securityModel' and 'securityName' into one or more groups in addition to the 'vacmGroupName' mapped in the 'vacmSecurityToGroupTable' that are defined in an SNMP protocol such as RFC 3415. These groups provided for by the "cvacmSecurityToGroupTable" provide additional access control policies for a principal.

TABLE I

| | |
|---|---|
| cvacmSecurityToGroupTable | OBJECT-TYPE |
| SYNTAX | SEQUENCE OF CvacmSecurityToGroupEntry |
| MAX-ACCESS | Not-accessible |
| STATUS | current |

In one embodiment, the agent allows the same group mapping entry to be present in both the 'cvacmSecurityToGroupTable' and the 'vacmSecurityToGroupTable'.

A row in the "cvacmSecurityToGroup" table does not exist without a corresponding row for the same combination of "securityModel" and "securityName" in the "vacmSecurityToGroupTable", in one embodiment. While creating a row in the "cvacmSecurityToGroupTable" table, if there is no corresponding row for the same combination of "securityModel" and "securityName" in the "vacmSecurityToGroupTable," the same mapping entry is created in the "vacmSecurityTo- GroupTable" by the agent using the values of instance variables of the entry in the "cvacmSecurityToGroupTable" table, in one embodiment.

The deletion of a row in the 'vacmSecurityToGroupTable', also causes the deletion of all the group mapping entries for the same combination of ivacmSecurityModer and VacmSecurityName' in the 'cvacmSecurityToGroupTable', in one embodiment. The deletion of a row in this table does not affect 'vacmSecurityToGroupTable' entries, in one embodiment.

Table II describes a conceptual row "cvacmSecurityToGroupEntry" in the "cvacmSecurityToGroup Table" depicted in Table I herein. Each row represents one groupName mapping for the combination of 'securityModel' and 'securityName' in the system. Further, each row comprises a storage type and row status. Table II describes an index for the "cvacmSecurityToGroupTable," wherein "cvacmSecurityGrpName" is described herein in Table III herein.

TABLE II

```
cvacmSecurityToGroupEntry OBJECT-TYPE
    SYNTAX          cvacmSecurityToGroupEntry
    MAX-ACCESS      not-accessible
    STATUS          current
    INDEX       {vacmSecurityModel,
                 vacmSecurityName,
                 cvacmSecurityGrpName}
    ::= { cvacmSecurityToGroupTable 1}
CvacmSecurityToGroupEntry ::=
    SEQUENCE {
        cvacmSecurityGrpName        SnmpAdminString,
        cvacmSecurityGrpStorageType StorageType,
        cvacmSecurityGrpStatus      RowStatus
    }
```

Table III depicts a group name "cvacmSecurityGrpName," which is the name of the group for the mapping represented by this row. This is in addition to the 'vacmGroupName' mapped in the 'vacmSecurityToGroupTable'. For example, a principal represented by 'securityName' maps to a group represented by 'cvacmSecurityGrpName' under a security model represented by 'securityModel'. This groupName is used as index into the 'vacmAccessTable' described in RFC 3415, in one embodiment. However, a value in this table does not imply that an instance with the value exists in table 'vacmAccessTable'. Referring to Table II herein, the group name "cvacmSecurityGrpName" is entry 1 in the sequence.

TABLE III

```
cvacmSecurityGrpName OBJECT-TYPE
    SYNTAX          SnmpAdminString(SIZE(1..32))
    MAX-ACCESS      not-accessible
    STATUS          current
    ::= { cvacmSecurityToGroupEntry 1}
```

Table IV depicts the storage type for a conceptual row. Conceptual rows having the value 'permanent' need not allow write-access to any columnar objects in the row, in one embodiment. Referring to Table II herein, the storage type is entry 2 in the sequence.

TABLE IV

```
cvacmSecurityGrpStorageType OBJECT-TYPE
    SYNTAX          StorageType
    MAX-ACCESS      read-create
    STATUS          current
    ::= { cvacmSecurityToGroupEntry 2}
```

Table V depicts the row status "cvacmSecurityGrpStatus" for a conceptual row. The value of this object has no effect on whether other objects in this conceptual row can be modified, in one embodiment. Referring to Table II herein, the row status is entry 3 in the sequence.

TABLE V

```
cvacmSecurityGrpStatus OBJECT-TYPE
    SYNTAX          RowStatus
    MAX-ACCESS      read-create
    STATUS          current
    ::= { cvacmSecurityToGroupEntry 3}
```

Figure 4:
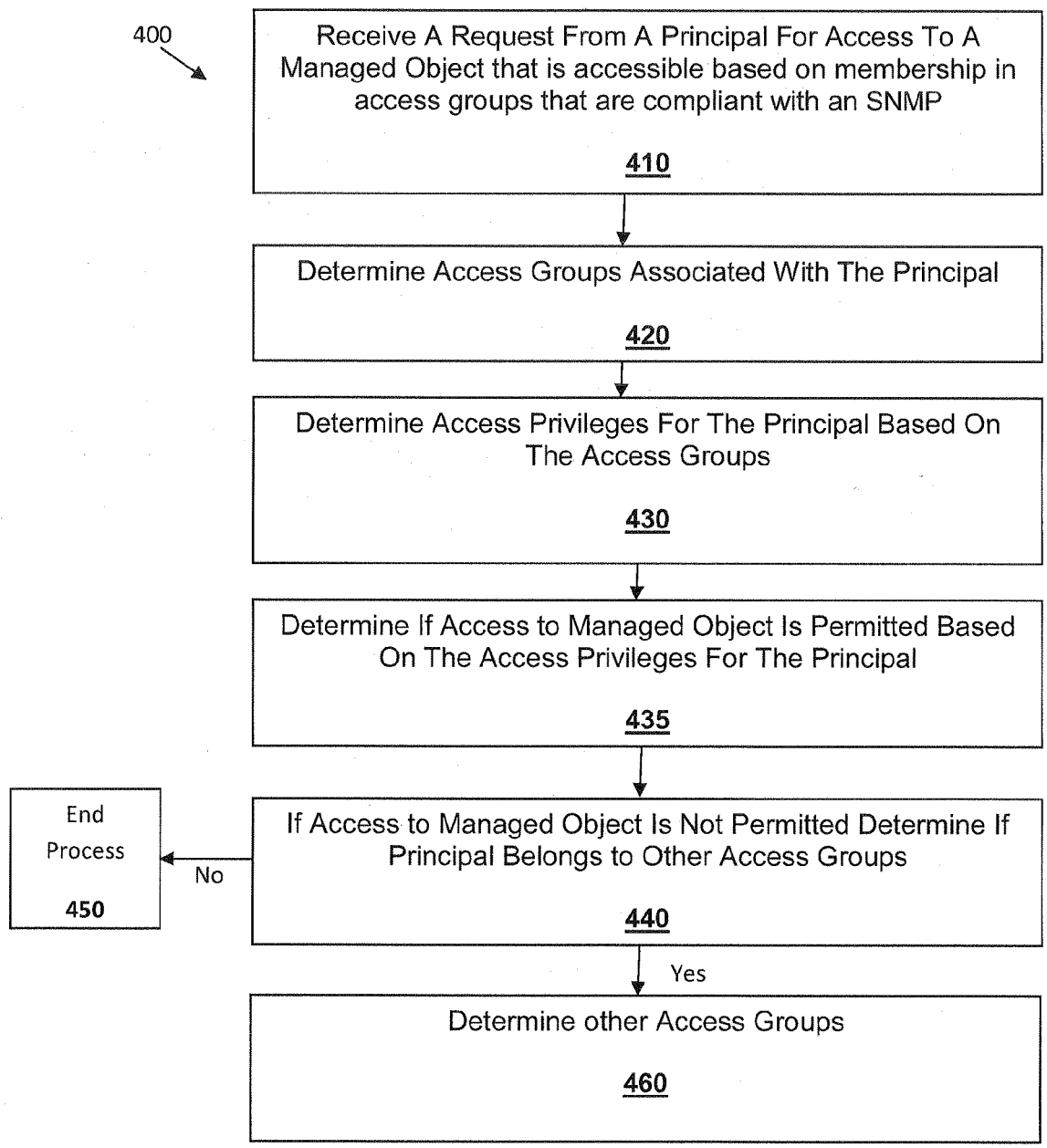
FIG. 4 is a flowchart illustrating steps of a process of controlling access to managed objects in a network device, in accordance with an embodiment of the present invention.

FIG. 4 is a flowchart illustrating steps of a process 400 of controlling access to managed objects in a network device, in accordance with an embodiment of the present invention. Process 400 may be implemented by engine 202 of managed device 126, although process 400 is not so limited. In one embodiment, process 400 is implemented as instructions embedded in a computer readable medium and executed in a processor. However, process 400 may be implemented by hardware or a combination of hardware and software.

Step 410 is receiving a request from a principal for access to a managed object associated with the networked device. The managed objects are accessible based on a requesting principal's membership in access groups that are compliant with a Simple Network Management Protocol (SNMP), in one embodiment.

Step 420 is determining a first access group associated with the principal. In one embodiment, step 420 comprises indexing a table that maps a principal name/security model combination to a single access group. However, step 420 is not limited to indexing a table that maps a principal name/security model combination to a single access group.

Step 430 is determining access privileges for the principal based on the presently examined access group. Step 430 may comprise indexing an access table with the group name determined in step 420 (or step 460). In one embodiment, the access table is compliant with an SNMP protocol.

Step 435 is granting access to the managed object if permitted based on the access privileges for the principal.

If access to the managed object is not allowed based on the group, then step 440 is performed to determine of the principal belongs to more access groups. If the principal is not in another access group, access to the managed object is denied in step 450. Process 400 then ends.

If the principal is in another access group, the next access group is determined in step 460. Step 460 may include indexing a table that may map a security name/security model to more than one access group. Process 400 then returns to step 430 to determine if access to the managed object is allowed for this access group. Process 400 continues until either access is granted or there are no more access groups for the principal.

SNMP groups may roughly map to Command Line Interface (CLI) "roles." Generally, it is possible to associate multiple roles with a CLI principal (e.g., user, application). However, a conventional SNMP protocol does not allow association of multiple groups with a single principal (e.g., user, principal). Embodiments of the present invention allow a single principal to be associated with multiple groups. Hence, an embodiment of the present invention allows groups to be aligned with CLI roles, enabling a unified security model.

Table VI depicts how allowing users to be assigned to multiple groups allows a unified security model, in accordance with an embodiment of the present invention. The CLI users U1, U2, and U3 might be assigned roles R1-R5 as depicted. Embodiments of the present invention allow alignment of the user roles to SNMP groups, wherein the user is assigned to SNMP groups that are analogous to CLI roles. Therefore, users U1-U3 are assigned to groups G1-G5, wherein groups G1-G5 are similar in functionality as their corresponding roles R1-R5 in CLI.

TABLE VI

| User | CLI Role | SNMP Group |
| --- | --- | --- |
| U1 | R1, R2, R5 | G1, G2, G5 |
| U2 | R1, R3 | G1, G3 |
| U3 | R2, R3, R4 | G2, G3, G4 |

The foregoing descriptions of specific embodiments of the present invention have been presented for purposes of illustration and description. They are not intended to be exhaustive or to limit the invention to the precise forms disclosed. Many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of controlling access to managed objects associated with a networked device, said method comprising:
   receiving a request from a management station for access to a managed object of said managed objects;
   said networked device comprising a first management engine configured for controlling access to the managed object, wherein said managed objects are accessible via the management station based on membership in access groups;
   wherein the first management engine is compliant with a Role-Based Command Line Interface (CLI) Access protocol and a Simple Network Management Protocol (SNMP);
   wherein the management station comprises a second management engine configured for requesting access to the managed object;
   wherein the second management engine is compliant only with the SNMP;
   wherein the management station is aware that the first management engine is compliant with the SNMP and not aware that the first management engine is compliant with the Role-Based CLI Access protocol;
   wherein said access groups define one or more access privileges to said managed objects, and wherein said access groups are compliant with SNMP;
   aligning two or more access groups with respective analogous roles of a plurality of roles in the Role-Based CLI Access protocol wherein the alignment corresponds to a unified security model;
   associating a first and a second of said two or more access groups with a principal corresponding to the access request;
   determining a set of access privileges for said principal based on a union of said first and said second access groups; and
   granting access to said managed object if said determined set of access privileges for said principal comprises an access privilege to said managed object.

2. The method as recited in claim 1, wherein said determining said first and said second access groups comprises indexing a table that maps a principal name and a security model to said first and second access groups.

3. The method as recited in claim 1, wherein said determining said first and said second of said access groups further comprises indexing a first table that maps a principal name mapping entry and a security model mapping entry to said first access group and indexing a second table that maps said principal name mapping entry and said security model mapping entry to said second access group.

4. A device comprising:
   memory for storing a management information base defining managed objects, wherein access to said managed objects is permitted based on a request from a network management device, wherein the request indicates a principal is a member of at least one of a plurality of access groups that are complaint with a Simple Network Management Protocol (SNMP), wherein each of said access groups defines a set of access privileges; and
   one or more processors coupled to the memory, the one or more processors comprising a device engine configured to control access to said managed objects based on membership in the at least one of a plurality of access groups;
   wherein if the request indicates that the principal is a member of two or more access groups, then the access to a managed object of said managed objects is based on a union of access privileges associated with the two or more groups;
   wherein the device engine is further configured to perform access control based on roles in accordance with a Role-Based Command Line Interface (CLI) Access protocol and configured to align the access groups of the SNMP with corresponding roles of the Role-Based CLI Access protocol to create a unified security model;
   wherein the network management device comprises a network management engine, wherein the network management engine is aware that the device engine is compliant with the SNMP and not aware that the device engine is compliant with the CLI Access protocol.

5. The device as recited in claim 4, wherein the memory is further for storing a first table for mapping a principal name entry and security model entry to multiple ones of said access groups.

6. The device as recited in claim 5, wherein the memory is further for storing a second table for mapping said principal name entry and security model entry to only one of said access groups.

7. A system for controlling access to objects, said system comprising:
   a managed node comprising:
      memory for storing a management information base (MIB) defining managed objects, wherein said managed objects are accessible based on membership in access groups that are compliant with a Simple Network Management Protocol (SNMP), and wherein said access groups each define a set of access privileges; and
      a managed node engine comprising one or more processors, the one or more processors configured to:
         control access to said managed objects defined in the MIB in response to a request for access to a managed object selected from the managed objects, the request specifying a principal name, wherein said managed node engine enforces a set of rules including a rule in which said principal name is associated with one or more of said access groups, and wherein if the principal name is associated with to two or more of said access groups then access privileges associated with said principal name comprise a union of all sets of access privileges of said two or more access groups;

control access to said managed objects based on roles compliant with a Role-Based CLI protocol; and align the access groups compliant with the SNMP with analogous roles associated with the Role-Based CLI protocol to create a unified security model;

the management node configured to send said request to said managed node for access to said managed object, wherein said management node comprises a management node engine for performing access control, wherein the management node engine is aware that the managed node engine is compliant with the SNMP and not aware that managed node engine is also compliant with the Role-Based CLI Access protocol;

wherein the management node engine is compliant only with SNMP.

8. The system as recited in claim 7, wherein said management node issues a request on behalf of a principal belonging to a first and a second of said access groups.

9. The system as recited in claim 7, wherein said managed node memory is further for storing a first table that maps said principal name and a security model to multiple ones of said access groups, and wherein said managed node engine is configured to index said table to determine at least a first and a second access group to which said principal name belongs.

10. The system as recited in claim 9, wherein said managed node memory is further for storing a second table that maps said principal name and said security model to only one of said access groups.

11. A device comprising:

means for storing managed objects, wherein said managed objects are accessible based on membership in access groups that are compliant with a Simple Network Management Protocol (SNMP), wherein each of said access groups defines a set of access privileges;

means for controlling access to said managed objects in compliance with SNMP responsive to receiving a request for access to a managed object of the managed objects from a means for managing the means for controlling access to said managed objects, wherein said means for controlling is further for enforcing a set of rules comprising a rule in which a principal requesting access to a managed object is associated with more than one of said access groups, and wherein said principal is granted access privileges to said managed objects based on said a union of access privileges of all access groups to which said principal belongs; and wherein the means for controlling access to managed objects in compliance with SNMP is further for controlling access to managed objects based on roles in compliance with a Role-Based Command Line Interface (CLI) Access Protocol, and wherein said roles are aligned with respective ones of said access groups, wherein said roles and said respective access groups are aligned based on similar functionality and wherein the principal is associated with roles aligned with all the access groups that are associated with the principal;

wherein the means for managing the means for controlling access to said managed objects is aware of compliance of the means for controlling access to said managed objects with the SNMP and not aware of the means for controlling access to said managed objects compliance with Role-Based CLI Access Protocol.

12. The device as recited in claim 11, further comprising means for storing a table that maps a principal name and a security model to multiple ones of said access groups, and wherein said means for controlling access is further for indexing said table to determine access groups to which said principal name belongs.

* * * * *

UNITED STATES PATENT AND TRADEMARK OFFICE
CERTIFICATE OF CORRECTION

| | | |
|---|---|---|
| PATENT NO. | : 7,769,859 B1 | Page 1 of 1 |
| APPLICATION NO. | : 11/107500 | |
| DATED | : August 3, 2010 | |
| INVENTOR(S) | : Gaonkar et al. | |

It is certified that error appears in the above-identified patent and that said Letters Patent is hereby corrected as shown below:

Column 10, line 14 (Claim 11):    After "on" delete "said".

Signed and Sealed this
Eighteenth Day of January, 2011

David J. Kappos
*Director of the United States Patent and Trademark Office*